(No Model.)
D. H. SMITH.
Tug Fastener.
No. 238,537. Patented March 8, 1881.
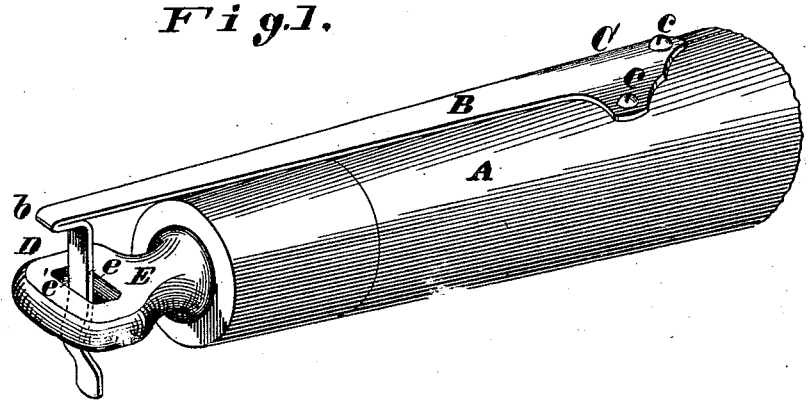
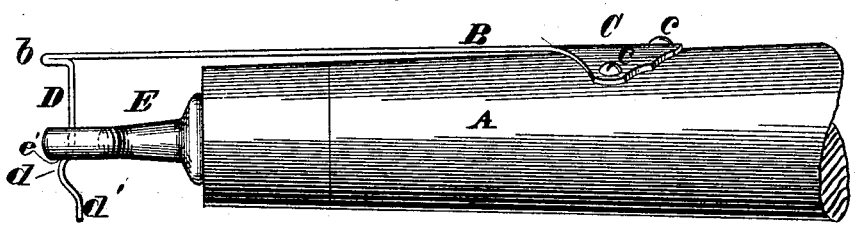
Attest:
H. E. Barnes
Charles Pokles
Inventor:
D. H. Smith

UNITED STATES PATENT OFFICE.

DAVID H. SMITH, OF ST. LOUIS, MISSOURI.

TUG-FASTENER.

SPECIFICATION forming part of Letters Patent No. 238,537, dated March 8, 1881.

Application filed November 1, 1880. (No model.)

*To all whom it may concern:*

Be it known that I, DAVID H. SMITH, of 2816 Morgan street, city of St. Louis, Missouri, have made a new and useful Improvement in Tug-Fasteners, of which the following is a full, clear, and exact description, reference being had to the annexed drawings, making part of this specification, in which—

Figure 1 is a view in perspective, showing the improvement in position upon a whiffletree, and Fig. 2 a side elevation of the same.

Similar letters denote the same parts.

The present improvement, generally considered, consists in a spring-guard, which, at its inner end, is attached to the whiffletree, and extending from its point of connection with the tree beyond the bearing where the tug is held, and at its outer end shaped and extended to inclose the tug and keep it from becoming detached from the tree. To attach the tug to the tree the outer end of the guard is sprung upward sufficiently for the tug to be passed onto the tree, whereupon the guard is released and allowed to spring back and inclose the tug.

The improvement relates to the special construction of the spring-guard shown and described, and which is carried out in the following manner:

A represents a whiffletree of the usual construction.

B represents the spring-guard in question. It is fastened to the tree at C, and by any suitable fastening, *c c*.

E represents the usual hook or bearing upon the tree to receive the tug. The guard extends outward beyond the bearing C and then downward opposite or past the bearing, the extension D being sufficiently close to the bearing to keep the tug from becoming detached therefrom as long as the extension D is in the position shown. The guard is of springy material, enabling it to be sprung upward sufficiently for the lower end of the part D to clear the bearing C and allow the tug to be attached thereto. To provide for readily lifting the guard it is provided with a handle, *b*, which stands out beyond the part D.

The guard can be used with any of the ordinary trees; but to enable it to be used to advantage with a tree having a hook such as shown at E, and having the perforation *e*, the part D is made of springy material, and is curved at *d*, and the parts are arranged so that the curve *d*, when the guard is down, comes underneath the outer end, *e'*, of the hook E, and acts as a shoulder to prevent the guard from being raised, saving when the part D is pressed inward toward the tree. The lower end, *d'*, of the part D is straightened, as shown, so as to present a flat surface to the tug.

I am aware that spring tug-fasteners have heretofore been used.

I claim—

In combination with a tree, A, the spring-guard B, said guard having the handle *b* attached rigidly thereto, and as shown, and having the part D and the handle *b*, said guard part and handle being in one piece, substantially as described.

D. H. SMITH.

Witnesses:
   C. D. MOODY,
   CHARLES PICKLES.